United States Patent [19]

Pickering

[11] 4,406,560

[45] Sep. 27, 1983

[54] PIPE CONNECTOR

[75] Inventor: David J. Pickering, Reading, England

[73] Assignee: Kee Klamps Limited, Berkshire, England

[21] Appl. No.: 239,109

[22] Filed: Feb. 27, 1981

[30] Foreign Application Priority Data

Feb. 27, 1980 [GB] United Kingdom ............... 8006677

[51] Int. Cl.³ .................... F16B 7/00; F16B 12/36; F16B 13/00
[52] U.S. Cl. ................................. 403/297; 403/295
[58] Field of Search ............ 403/295, 297, 103, 401, 403/402, 148, 149

[56] References Cited

U.S. PATENT DOCUMENTS

| | | | |
|---|---|---|---|
| 1,678,350 | 7/1928 | Ott | 403/297 X |
| 3,829,226 | 8/1974 | Kreusel | 403/297 X |
| 3,958,889 | 5/1976 | Berkowitz | 403/297 X |
| 3,966,342 | 6/1976 | Moriya | 403/297 X |

Primary Examiner—Wayne L. Shedd
Attorney, Agent, or Firm—Wenderoth, Lind & Ponack

[57] ABSTRACT

A pipe connector for connection to a pipe having a plain end comprises a body having a profile matching that of the pipe, and a pair of jaws extending outwardly for insertion within the end of the pipe. The jaws are formed with oppositely directed clamping surfaces for engaging the inner wall surface of the pipe end. One of the jaws is fixed and integral with the body. The other jaw is pivotally mounted on the fixed jaw and is extended inwardly of the body where it is threadedly engaged by a screw which connects the pivoted jaw with the body so that by rotating the screw in the appropriate direction the pivoted jaw pivots away from or towards the fixed jaw to clamp or unclamp the jaws from the pipe. The screw thus provides a positive clamping force which greatly assists the dismantling of the connector from a pipe end when desired. The screw also retains the pivoted jaw in place and there are no loose parts to become lost.

5 Claims, 3 Drawing Figures

PIPE CONNECTOR

This invention relates to a pipe connector for gripping the interior of the pipe thereby to give a continuous flush profile.

Slip-on type fittings for connecting lengths of pipe in which a plain end of the pipe is inserted into an opening in the fitting have been known for many years but with fittings of this type it is not possible to have a continuous flush profile extending over the exterior surfaces of both the pipe and the fitting, which detracts from the appearance and utility of many structures where such fittings are used, for example hand-rails, guard-rails, shelving, racking, display frames, agility apparatus and so on.

It is accordingly an object of this invention to provide an improved pipe connector which is inexpensive, is easy to assemble and dismantle, and which grips the pipe internally thereby to give a continuous flush profile.

A pipe connector according to one aspect of the invention comprises a body having a profile matching that of a pipe, and a pair of jaws extending outwardly from the body for insertion within an end of the pipe. The jaws have respective oppositely directed pipe clamping surfaces for engaging the interior of the pipe, and one of the jaws is fixed relative to the body while the other of the jaws is pivotable with respect to the fixed jaw. Actuating means are connected between the body and the pivoted jaw for positively pivoting the pivoted jaw away from the fixed jaw to urge the pipe clamping surfaces of the jaws to a position to grip the inner wall surface of a pipe end positioned over the jaws.

Preferably the pivoted jaw has an outer end opposed to the fixed jaw and provided with the pipe clamping surfaces, and an inner end housed within the body, and is pivotally mounted intermediate its ends on the fixed jaw. The actuating means may be a screw threadedly engaged in a hole in the inner end of the pivoted jaw and having an exteriorly accessible head rotatable in the body and engaging an axial bearing surface in the body. By rotating the screw in the appropriate direction the pivoted jaw pivots towards and away from the fixed jaw to clamp and unclamp the interior of the pipe which is disposed over the jaws. The screw serves the further purpose of retaining the fixed jaw in place in the connector so that there are no loose parts to become lost.

A further advantage of an actuating means of the above description is that it provides a positive unclamping force as well as a positive clamping force. This greatly assists the dismantling of the connector from a pipe end when desired.

The fixed jaw is preferably bifurcate and the pivoted jaw has a locating flange received between the two arm portions of the fixed jaw to prevent the jaws twisting in use. The two arms of the fixed jaw from may be connected by a transverse web, and the flange of the pivoted jaw may be notched to locate over the web and provide thereby a simple yet secure pivotal mounting.

A pipe connector embodying the invention will now be described by way of example with reference to the accompanying drawings in which.

Figure 1:
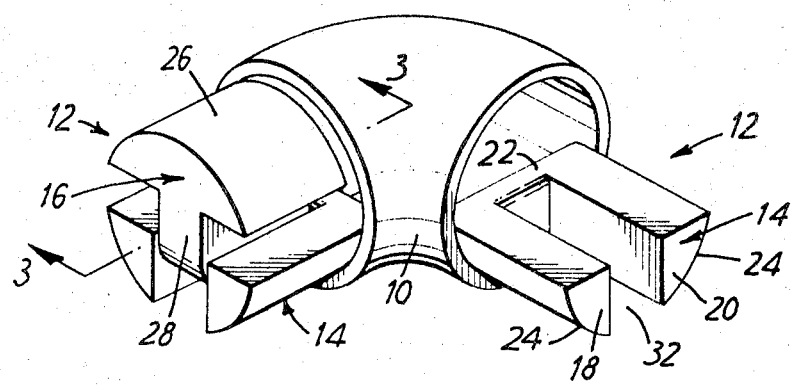
FIG. 1 is a perspective view of an angled connector according to the present invention, the pivoted jaw having been removed from the right-hand side in order to show the details of the fixed jaw thereat.
Figure 2:
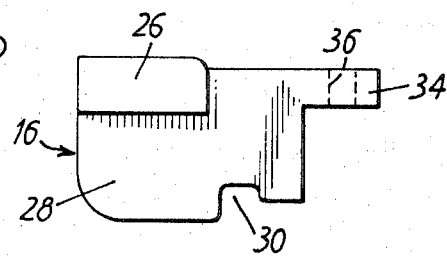
FIG. 2 is a side view of a pivoted jaw.
Figure 3:
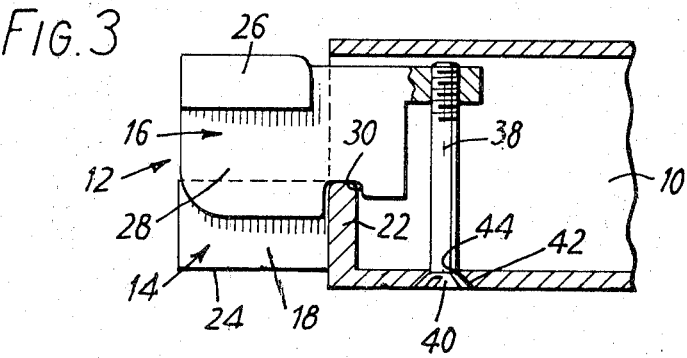
FIG. 3 is a side view, partly in section, on the line 3—3 in FIG. 1.

The pipe connector shown in the drawings comprises a hollow body 10 having a profile matching that of the pipe (not shown) with which the connector is to be used. The connector shown in FIG. 1 is a 90° corner connector for connecting two pipes at right-angles. Two pairs of jaws 12 extend outwardly from the body for connection with the ends of the two pipes. Each pair of jaws 12 comprises a fixed jaw 14 and a pivoted jaw 16. The fixed jaw 14 is bifurcate and comprises two arms 18 and 20 connected adjacent the body 10 by a transverse wall 22. The outer peripheral surfaces of the jaw 14, and in particular of the two arms 18 and 20, and the outer peripheral surface of the jaw 16 are formed as oppositely directed clamping surfaces 24 and 26 respectively which are configured to fit snugly within the open end of the pipe. The jaw 14 is rigidly connected to the body 10, for example by welding, or may be cast integrally therewith.

The pivoted jaw 16 has a depending locating flange 28 which contains a notch 30. The flange 28 is receivable within the gap 32 between the two arms 18 and 20 of the fixed jaw 14, and the notch 30 engages over the transverse wall 22 so that the jaw 16 is pivotable relative to the jaw 14 and the body 10. The end 34 of the jaw 16 remote from the clamping surface 26 has therein a tapped hole 36 threadedly engaged by a screw 38 having a head 40 in axial bearing engagement with the surface 42 of a countersunk hole 44 in the body 10. By rotating the screw 38 in the appropriate direction the jaw 16 pivots on the wall 22 away from the fixed jaw 14 so that the oppositely directed clamping surfaces 24 and 26 are forced into gripping engagement with the inner wall surface of a pipe end positioned over the jaws. By rotating the screw 38 in the opposite direction, the jaw 16 is caused to pivot towards the jaw 14 to release from the pipe end.

The pipe connector of the invention comprises only a minimum number of parts and is easily assembled. If the body 10 and the jaw 14 are integrally formed, the only additional parts are the jaw 16 and the screw 38, and the only machining necessary is the tapping of the hole 36 in the jaw 16 and the drilling of the hole 44 in the body 10 prior to assembly of the pipe connector. After assembly there are no loose parts. A structure built up from pipe and pipe connectors embodying the invention has an attractive flush appearance. The jaws 14 and 16 are wholly concealed, only the bodies 10 and the screw heads 40 being visible; the latter are, however, unobtrusive.

All parts of the pipe connector are reusable, and by appropriately forming the body 10 and the oppositely directed clamping surfaces 24 and 26 pipe connectors can be made for use with any cross-section of pipe. The pipe connectors can be made in any conventional configuration, such as straight, T- or cross-shape, and/or to include wall or floor mounted flanges.

The pipe connector of the invention may be manufactured in metal or in a suitable plastic material, for example to correspond with the type of material from which the pipes with which the connector may be used is made.

I claim:

1. A pipe connector for connection to a pipe having a plain end, said pipe connector comprising a body having a profile matching that of the pipe, a pair of jaws extending outwardly from the body for insertion within the end of the pipe, and respective oppositely directed pipe clamping surfaces on said jaws for engaging the interior of the pipe, one of the jaws being a bifurcate jaw fixed relative to said body and having two longitudinal jaw portions connected by a transverse web, the other of the jaws being mounted for pivotal movement with respect to said fixed jaw and having a locating flange therein slidably received between the two arms of said fixed bifurcate jaw for being guided therebetween during pivoting, said locating flange having a notch in which said web is engaged for forming the pivotal mounting of said other jaw, and actuating means connected between said body and said pivoted jaw for positively pivoting said pivoted jaw away from the fixed jaw to urge the pipe clamping surfaces of said jaws to a position to grip the inner wall surface of a pipe end positioned over the jaws.

2. A pipe connector as claimed in claim 1 wherein said pivoted jaw has an outer end opposed to the fixed bifurcate jaw and provided with said pipe clamping surface and an inner end held within said body, and said flange being intermediate the ends of said pivoted jaw, and said actuating means is a screw threadedly engaged with the inner end of said pivoted jaw and having an exteriorly accessible head engaging a bearing surface in said body, whereby upon rotation of said screw in the appropriate direction the outer end of said pivoted jaw moves away from or toward said fixed bifurcate jaw to respectively engage or disengage the clamping surfaces and the inner wall surface of the pipe end.

3. A pipe connector according to claim 1, which is made of metal.

4. A pipe connector according to claim 1, which is made of plastic material.

5. A pipe connector according to claim 1, wherein the body and the fixed jaw are of integral construction.

* * * * *